(12) United States Patent
Boerhout

(10) Patent No.: US 10,545,071 B2
(45) Date of Patent: Jan. 28, 2020

(54) HIGH EFFICIENCY ROTATIONAL MACHINE INTEGRITY DETERMINATION SYSTEMS AND METHODS

(71) Applicant: Aktiebolaget SKF, Gothenburg (DE)

(72) Inventor: Johannes I. Boerhout, San Diego, CA (US)

(73) Assignee: AKTIEBOLAGET SKF, Gothenburg (SE)

( * ) Notice: Subject to any disclaimer, the term of this patent is extended or adjusted under 35 U.S.C. 154(b) by 497 days.

(21) Appl. No.: 14/663,314

(22) Filed: Mar. 19, 2015

(65) Prior Publication Data

US 2015/0192500 A1 Jul. 9, 2015

Related U.S. Application Data

(63) Continuation of application No. 13/991,994, filed as application No. PCT/US2012/072299 on Dec. 31, 2012, now Pat. No. 8,996,335.
(Continued)

(51) Int. Cl.
*G01M 13/00* (2019.01)
*H04W 52/02* (2009.01)
(Continued)

(52) U.S. Cl.
CPC .............. *G01M 13/00* (2013.01); *G01M 7/00* (2013.01); *G01M 13/028* (2013.01);
(Continued)

(58) Field of Classification Search
None
See application file for complete search history.

(56) References Cited

U.S. PATENT DOCUMENTS

| 4,422,333 A | 12/1983 | Leon |
| 4,612,620 A | 9/1986 | Davis et al. |

(Continued)

FOREIGN PATENT DOCUMENTS

| JP | 07261834 A | 10/1995 |
| JP | 07219624 A | 8/1999 |

(Continued)

OTHER PUBLICATIONS

Lembregts et al., Off-line Synchronous resampling of vibration measurement; Instrumentation and Measurement Technology Conference, 1996. IMTC-96. Conference Proceedings., IEEE LMS International NV, pp. 748-755.

(Continued)

*Primary Examiner* — John C Kuan
(74) *Attorney, Agent, or Firm* — Garcia-Zamor Intellectual Property Law, LLC; Ruy Garcia-Zamor; Bryan Peckjian

(57) ABSTRACT

Methods and systems to achieve highly efficient rotational machine integrity determinations in which at least one sensor (106) senses indicia (105) such as time-varying rotational indicia from a rotational motive apparatus (103) and a processor (108) may provide many different functions including but not limited to operational function energy apportioning decisional processing, data compression, intelligent hierarchical data ranking, differential data processing, or the like perhaps to generate information (109) such as a rotational integrity abridgment transmissor to which an abridgment transmissor electromagnetic signal (112) may be created and perhaps even transmitted from a rotational motive apparatus to facilitate a machine integrity determination.

13 Claims, 4 Drawing Sheets

Related U.S. Application Data

(60) Provisional application No. 61/582,278, filed on Dec. 31, 2011.

(51) Int. Cl.
*G01M 13/028* (2019.01)
*G01M 7/00* (2006.01)
*G01M 99/00* (2011.01)
*G01H 1/00* (2006.01)

(52) U.S. Cl.
CPC ..... *G01M 99/005* (2013.01); *H04W 52/0261* (2013.01); *G01H 1/003* (2013.01); *G08C 2201/12* (2013.01); *Y02D 70/00* (2018.01); *Y02D 70/142* (2018.01); *Y02D 70/144* (2018.01); *Y02D 70/21* (2018.01)

(56) References Cited

U.S. PATENT DOCUMENTS

| | | |
|---|---|---|
| 4,931,949 A | 6/1990 | Hernandez et al. |
| 5,115,406 A | 5/1992 | Zatezalo et al. |
| 5,233,540 A | 8/1993 | Andersson et al. |
| 5,311,446 A | 5/1994 | Ross et al. |
| 5,471,880 A | 12/1995 | Lang et al. |
| 5,943,634 A | 8/1999 | Piety et al. |
| 6,053,047 A * | 4/2000 | Dister ................. G01M 13/028 73/593 |
| 6,192,325 B1 | 2/2001 | Piety et al. |
| 6,270,628 B1 | 8/2001 | Suomi et al. |
| 6,298,725 B1 | 10/2001 | Forrester |
| 6,343,251 B1 | 1/2002 | Herron et al. |
| 6,374,195 B1 | 4/2002 | Li et al. |
| 6,421,615 B1 | 7/2002 | Nakajima et al. |
| 6,484,109 B1 | 11/2002 | Lofall |
| 6,507,165 B2 | 1/2003 | Kato et al. |
| 6,507,804 B1 | 1/2003 | Hala et al. |
| 6,526,829 B1 | 3/2003 | Lysen et al. |
| 6,549,869 B1 | 4/2003 | Piety et al. |
| 6,633,822 B2 | 10/2003 | Maness et al. |
| 6,704,617 B2 | 3/2004 | Cherfane et al. |
| 6,735,549 B2 | 5/2004 | Ridolfo |
| 6,789,025 B2 | 9/2004 | Boerhout |
| 7,096,159 B2 | 8/2006 | Cataltepe et al. |
| 7,099,782 B2 | 8/2006 | Hitchcock et al. |
| 7,127,373 B2 | 10/2006 | House et al. |
| 7,206,646 B2 | 4/2007 | Nixon et al. |
| 7,263,459 B2 | 8/2007 | Ito et al. |
| 7,289,919 B2 | 10/2007 | Boerhout |
| 7,313,502 B2 | 12/2007 | Schuster et al. |
| 7,324,924 B2 | 1/2008 | Barajas et al. |
| 7,634,384 B2 | 12/2009 | Eryurek et al. |
| 7,660,701 B2 | 2/2010 | Sharpe, Jr. |
| 7,676,285 B2 | 3/2010 | Hoyte et al. |
| 7,822,580 B2 | 10/2010 | Mustonen |
| 7,930,111 B2 | 4/2011 | Lou et al. |
| 2005/0119840 A1 | 6/2005 | Astley et al. |
| 2008/0047363 A1 | 2/2008 | Arms et al. |
| 2009/0271151 A1 | 10/2009 | Oneal et al. |
| 2010/0071469 A1 | 3/2010 | Luo et al. |
| 2010/0085205 A1 | 4/2010 | Tomplins et al. |
| 2012/0209569 A1 | 8/2012 | Becourt et al. |
| 2013/0127637 A1* | 5/2013 | Seroussi ........... H04W 52/0251 340/870.39 |
| 2013/0173202 A1 | 7/2013 | Boerhout |
| 2014/0091953 A1* | 4/2014 | Scott ................. H04N 19/17 341/87 |
| 2014/0195197 A1 | 7/2014 | Boerhout |
| 2015/0173073 A1* | 6/2015 | Lindoff .................. H04L 47/32 370/329 |
| 2015/0192495 A1 | 7/2015 | Boerhout |

FOREIGN PATENT DOCUMENTS

| | | |
|---|---|---|
| WO | 03006935 A1 | 1/2003 |
| WO | 2012/015389 | 2/2012 |

OTHER PUBLICATIONS

Peng et al., Application of the wavelet transform in machine condition monitoring and fault 1-64 diagnostics: a review with bibliography, Mechanical Systems and Signal Processing, vol. 18, Issue 2, Mar. 2004, pp. 199-221, ISSN 0888-3270, 10.1016/S0888-3270(03)00075-X.

Chan et al., "A Novel, Fast, Reliable Data Transmission Algorithm for Wireless Machine Health 1-64 Monitoring," Reliability, IEEE Transactions on , vol.58, No. 2, pp. 295,304, Jun. 2009.

U.S. Appl. No. 61/582,278, filed Dec. 31, 2011.

International Patent Application No. PCT/US2012/072299, filed Dec. 31, 2012, International Search Report dated Mar. 12, 2013.

International Patent Application No. PCT/US2012/072299, filed Dec. 31, 2012, Written Opinion of the International Searching Authority dated Mar. 12, 2013.

Parent U.S. Appl. No. 13/991,994, Office Action dated Jun. 6, 2014.

Parent U.S. Appl. No. 13/991,994, Notice of Allowance dated Nov. 21, 2014. 14 pages.

Parent U.S. Appl. No. 13/991,994, filed Jun. 6, 2013.

U.S. Appl. No. 13/731,712, filed Dec. 31, 2012, Office Action dated Oct. 20, 2015; 16 pages.

* cited by examiner

HIGH EFFICIENCY ROTATIONAL MACHINE INTEGRITY DETERMINATION SYSTEMS AND METHODS

PRIORITY CLAIM

This application is a continuation of U.S. application Ser. No. 13/991,994 filed Jun. 6, 2013, which claim priority to and the benefit of international PCT application number PCT/US12/72299, filed Dec. 31, 2012, which claims the benefit of and priority to U.S. Provisional Application No. 61/582,278 filed Dec. 31, 2011, each hereby incorporated by reference herein.

TECHNICAL FIELD

The present invention generally relates to systems and methods for energy efficient monitoring of machine conditions. More particularly, the present invention concerns systems and methods for energy efficient data processing and even transmission in machine condition monitoring systems including but not limited to monitoring systems for electrical motors, rotational machines, non-rotational machines, and the like.

BACKGROUND

It is common for industrial and commercial facilities to operate a large number of machines such as electrical motors concurrently, many of which may cooperate in a large interdependent process or system. Despite increasingly efficient maintenance programs, at any time some percentage of the machines develop defects that are likely to lead to machine failure. For example, machines having moving parts (e.g., bearings) and experience constant friction that results in wear. It is known that bearing failures are a major cause of motor faults. Bearing damage due to wear may not be apparent absent gross damage or failure of the motor, however, because the bearing's wear site is likely concealed in the motor's assembled state.

Consequently, the use of machine condition monitoring systems has become essential to preventive maintenance of industrial machinery in order to avoid down time or catastrophic failure of machines. Unscheduled plant shutdowns can result in considerable financial losses. Failure of high performance machinery can lead to fatal injury and processing system backup. Typical benefits from a preventive maintenance program include longer periods between machinery shutdowns, evaluation of the condition of machine components without resorting to costly and/or destructive disassembly for visual inspection, and prolonging the machinery's operational life by taking corrective action when developing faults are identified early.

Measurement and analysis of machine vibrations typically includes sensing the machine's vibrations with a transducer that converts the vibration information to electrical signals. The electrical signals are processed so that a history of vibration amplitude over time can be obtained. Data points representing amplitude at a certain point in time may be plotted on a graph of amplitude versus time. This graph is often referred to as the time-domain vibration signature of the machine. FIG. 1 shows an exemplary graph of time-domain vibration data. FIG. 1 is a plot of measured acceleration of a point of a machine assembly over a period of about eight seconds. The particular machine from which this data was measured was rotating at 104.98 rpm, so FIG. 1 shows data over the course of about 15 revolutions. Peak values measured were about 0.025 g.

Rotating and reciprocating components of a machine produce vibrations having a wide range of frequencies. In addition to the time-domain data representation of machine vibrations, the vibrations of a machine, machine component, or other phenomena acting on the machine may be characterized by a plot of vibration energy as a function of vibration frequency. This diagram is commonly referred to as a "frequency spectrum," "spectral diagram," or "spectrum plot." FIG. 2 shows an exemplary frequency spectrum, which was derived from the time-domain vibration data of FIG. 1. Although the frequency scale is not illustrated in FIG. 2, prominent peaks are seen at about 10-11 Hz (designated as peak 10) and about 87 Hz (designated as peak 20).

The frequencies and associated peaks of the vibrations of a specific machine collectively make up the "frequency spectrum" for the machine, also known as the machine's "vibration signature." A machine's vibration signature varies with, for example, the design, manufacture, application, and wear of its components. The machine's normal operating conditions can determine the amplitude of steady (or "normal") vibration. It is a common practice to obtain a reference frequency spectrum when the machine is known to be in good condition for comparison against future measurements of the machine's frequency spectrum. Such comparison aids in detecting changes in the condition of the machine or its subcomponents. Hence, analysis of a machine's vibration signature provides valuable insights into the condition of the machine. Monitoring systems may include one or more sensors mounted on the machine and configured to measure a performance characteristic of the machine, such as vibration, temperature, pressure, etc. and as discussed in U.S. Pat. No. 7,289,919 to Boerhout hereby incorporated by reference in its entirety. Often, each machine has multiple sensors mounted at various locations on the machine, which may all be of the same type or different types. When different types of sensors are employed, each sensor type may use a measurement technique that differs from the other sensor types.

Further, the sensors may send data continuously to a connected central processing unit (i.e., hard-wired or wireless) or may periodically transmit data to a hand-held measuring device that is temporarily connected with the sensors. Such a hand-held unit may process the data to provide performance information (e.g., vibration level) directly to a user or may merely store the data for subsequent transfer to a separate processing device. The hand-held unit or other wireless vibration sensors may be battery powered and may consume substantial power during the acquisition, transmission, and processing steps. The transmission step may consume the most power.

There is a need to reduce the amount of power used during the process of sending, receiving, processing, or the like steps when machine data may be analyzed for monitoring systems to provide a more efficient system. The present invention is directed to energy efficient machine monitoring systems and methods along with data compression systems and methods, which may even be on-machine, to provide efficient use of sensor equipment during the acquisition, transmission, and/or processing steps of a machine's vibrations or other data.

DISCLOSURE OF INVENTION

In general, the present invention discloses methods and systems for energy efficient monitoring of machine conditions such as rotational motive apparatuses or the like.

An object of the present invention may include devices and methods to efficiently reduce power consumption when monitoring machine conditions. This may include a reduction in power consumption for the handling and perhaps even processing of data or information from a machine or plurality of machines or even when the data or other information may be transmitted from the machine(s) to monitoring devices or the like. Systems may include reducing the amount of power consumed during data acquiescence, data processing, data transmission, or the like.

Another object of the present invention may include increasing a battery life in devices such as but not limited to sensors, receivers, hand-held vibration sensor devices, or the like which may be used during machine condition monitoring to obtain data and perhaps analyze the performance conditions of the machine.

Yet another object of the present invention may include data compression programs and systems to be applied to the data or other information relating to a machine to increase efficiency of data sharing and even data processing during machine condition monitoring.

Naturally, further objects of the invention are disclosed throughout other areas of the specification.

BRIEF DESCRIPTION OF THE DRAWINGS

The following descriptions and referenced drawings are for selected embodiments of the present invention. Naturally, changes may be made to the disclosed embodiments while still falling within the scope and spirit of the present invention.

MODE(S) FOR CARRYING OUT THE INVENTION

Figure 1:
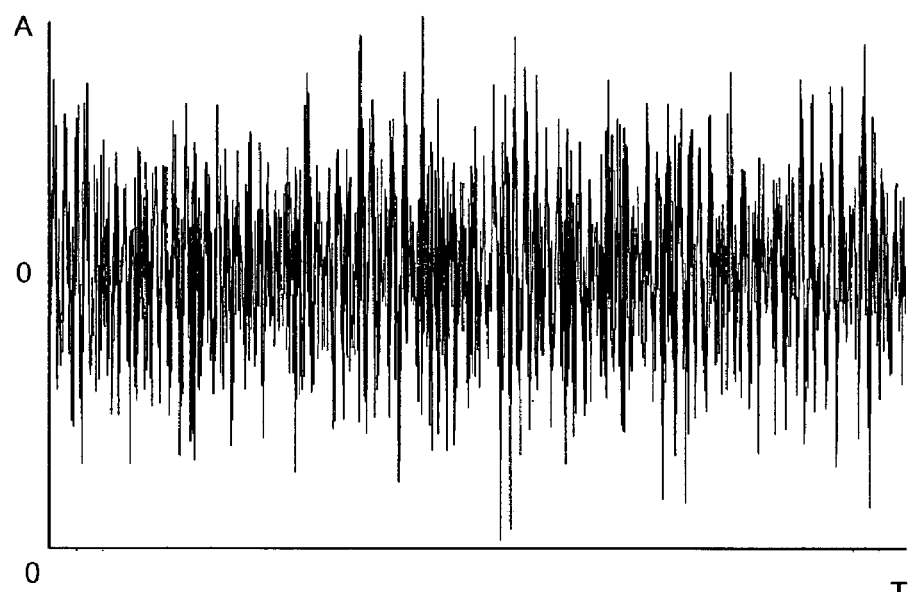
FIG. 1 is an example of a graph of a machine's time-domain vibration data before processing with the systems and methods of the invention.
Figure 2:
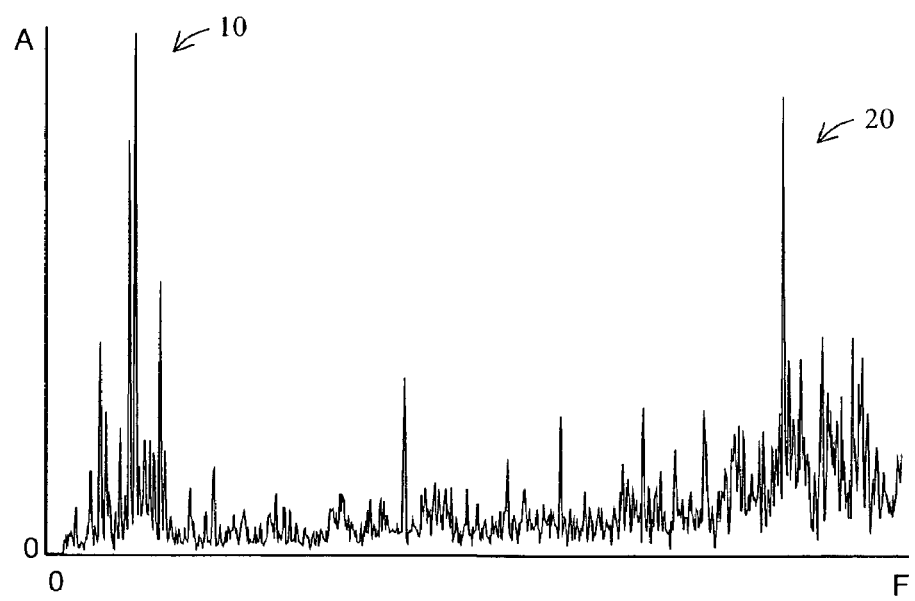
FIG. 2 is an example of a graph of the frequency spectrum of the time-domain data of FIG. 1.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In general, the present invention may provide systems and methods for energy efficient machine condition monitoring. Machines such as electrical motors perhaps in a plant system, interdependent process, or the like may be monitored to determine the performance conditions of the machine or plurality of machines or even apparatuses in order to provide preventative maintenance, forecasting of the machine performance, or the like. Preventive maintenance of industrial machinery may be beneficial in order to avoid down time or catastrophic failure of machines, may provide longer periods between machinery shutdowns, may provide evaluation of the condition of machine components without resorting to costly and/or destructive disassembly for visual inspection, and may even prolonging the machinery's operational life by taking corrective action when developing faults are identified early. The monitoring of the machines such as rotational motive apparatuses, including but not limited to electrical motors or the like, may be conducted by evaluation of data related to the machine. Various sensors may be used to collect machine data such as performance data, vibrations, frequencies, temperature, pressure, or the like and as discussed in U.S. Pat. No. 7,289,919 to Boerhout hereby incorporated by reference in its entirety. The sensors may be mounted to a machine or may even receive data wirelessly, via hard-wires, via connections, via temporary connections, or the like. Sensors or other devices may process data to generate processed data or the like. In embodiments, a wireless perhaps even hand-held data sensors may acquire waveform data or other data from a machine and may then transmit this data to a host, another device, computer, specialized computer, central computer, remote device, or the like perhaps for further processing, evaluation, storage, or the like.

Embodiments of the present invention may provide an energy efficient machine condition monitoring system perhaps where the machine monitoring devices such as sensors, hand-held devices, or other devices may use less power. A power supply may be any power provided to a device such as a battery, a power cord, DC power supply, AC power supply, or the like. In embodiments, energy used in machine condition monitoring systems may be defined as the amount of energy per 100 data events such processing, transmissions, storage, any combination thereof, and the like perhaps assuming that the there may be a constant amount of energy per resultant (compressed or not) data transmission. Reduction in the energy used during the machine condition monitoring system may occur during any or all of the acquisition, processing, transmission, storage or the like steps. A power reduction may include reducing energy per 100 data events by values including but not limited to at least about 2%, at least about 5%, at least about 10%, at least about 15%, at least about 20%, at least about 25%, about every 2% increment between at least about 1% and at least about 25%, and the like, for an individual step, combined steps, or perhaps even as an overall reduction in the entire process. For example, the use of a sensor such as a vibration sensor or a wireless hand-held device having a battery pack may have a reduction in energy consumption or even an increase in battery life perhaps with the above constraints.

The present invention, in embodiments, may provide a data transformation element which may provide compressed data so it can be efficiently utilized or even transmitted between devices. Data compression of a waveform may be desirable so that less energy may be used during the transmission of the signal and perhaps a longer battery life may be realized. A balance or even an apportionment may be determined to make sure that any compression algorithm and/or decompression algorithm may not be more power hungry than what could be saved by a less transmission time and perhaps less use of power. Therefore, a specific algorithm may require simplicity as well as effectiveness.

Figure 3:
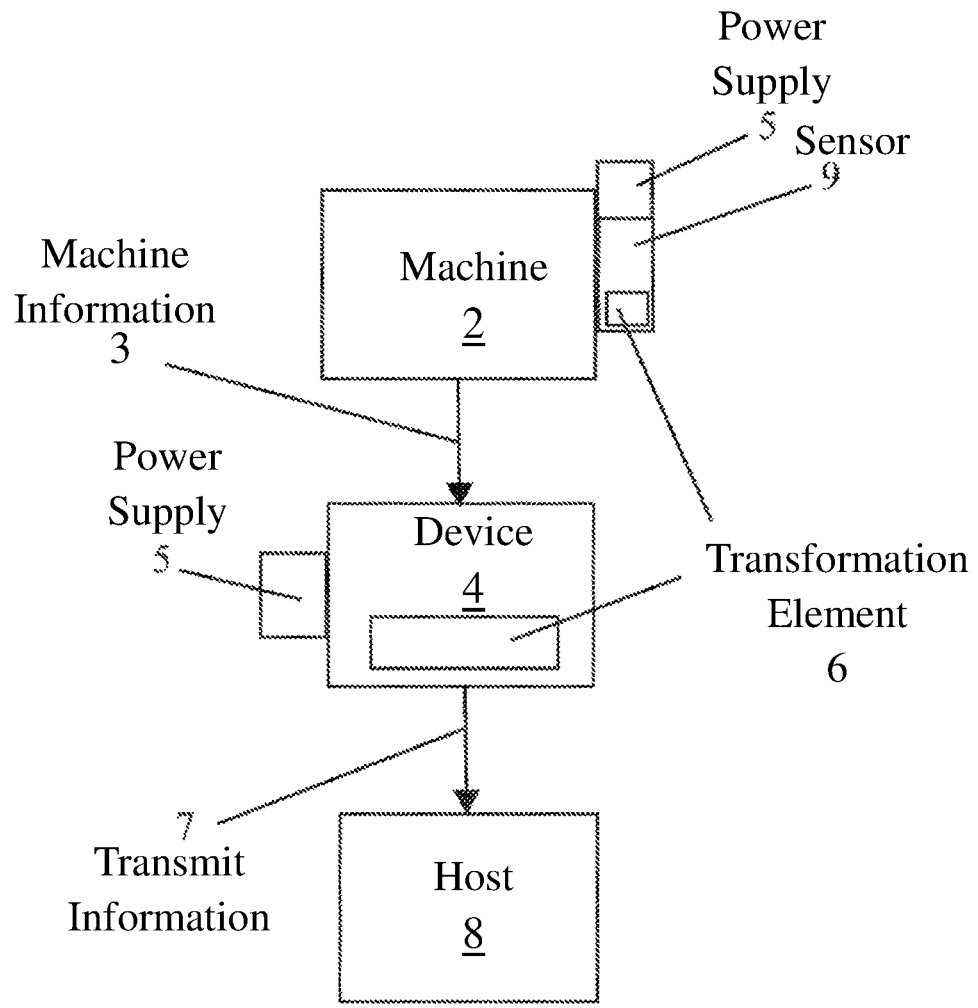
FIG. 3 is a block diagram of an exemplary energy efficient system in accordance with various embodiments of the present invention.

In general, FIG. 3 is a conceptual figure showing some of the embodiments of the present invention which may be utilized individually or in any combination in any particular system. A machine (2) which may be an electrical motor, part of a plurality of machines, part of a plant system, part of an interdependent process or even system, or the like may be provided. Information about the machine may be obtained by a sensor (9) which may be connected to the machine. Information may be also be obtained by a sensor or even a remote device (4) which may be a wireless, hand-held, or the like type device. Machine information (3) may be any kind of data or even indicia such as but not limited to vibrations, oscillations, waveforms, pressure, temperature, data, or the like as emitted or even transmitted from a machine (2). Machine information (3) may be data emitted or even transmitted from a sensor (9) to a device (4). In embodiments, a device (4) may be wireless, hard-wired, hand-held, portable, remote, a sensor, a vibration sensor, a specialized program downloaded onto a mobile device, a particularly configured computer, a specialized computer, computer, central processor, a central computer, a software system, a microlog, a marlin, a pen, or the like. A device (4) or even a sensor (9) may have a power supply (5) as discussed herein, which may be a battery, a power cord, DC power supply, AC power supply, or the like. A data transformation element (6) may be included in a device (4) or perhaps even in a sensor (9) or machine (2) which may provide a program, software, subroutines, or the like elements which may transform initial data and into transformed data as discussed herein. A device (4) or sensor (9) or machine (2) may transmit information (7) to a host (8) and a device (4) may even receive transmitted information (3) from a sensor (9) or even a machine (2). The transmitted information (7) or even information (3) in some embodiments, may be transformed data, compressed data, processed data, a rotational integrity abridgment transmissor, summary data, or the like perhaps relating to machine conditions. The host (8) may be another device, computer, central computer, remote device, or the like.

Figure 5:
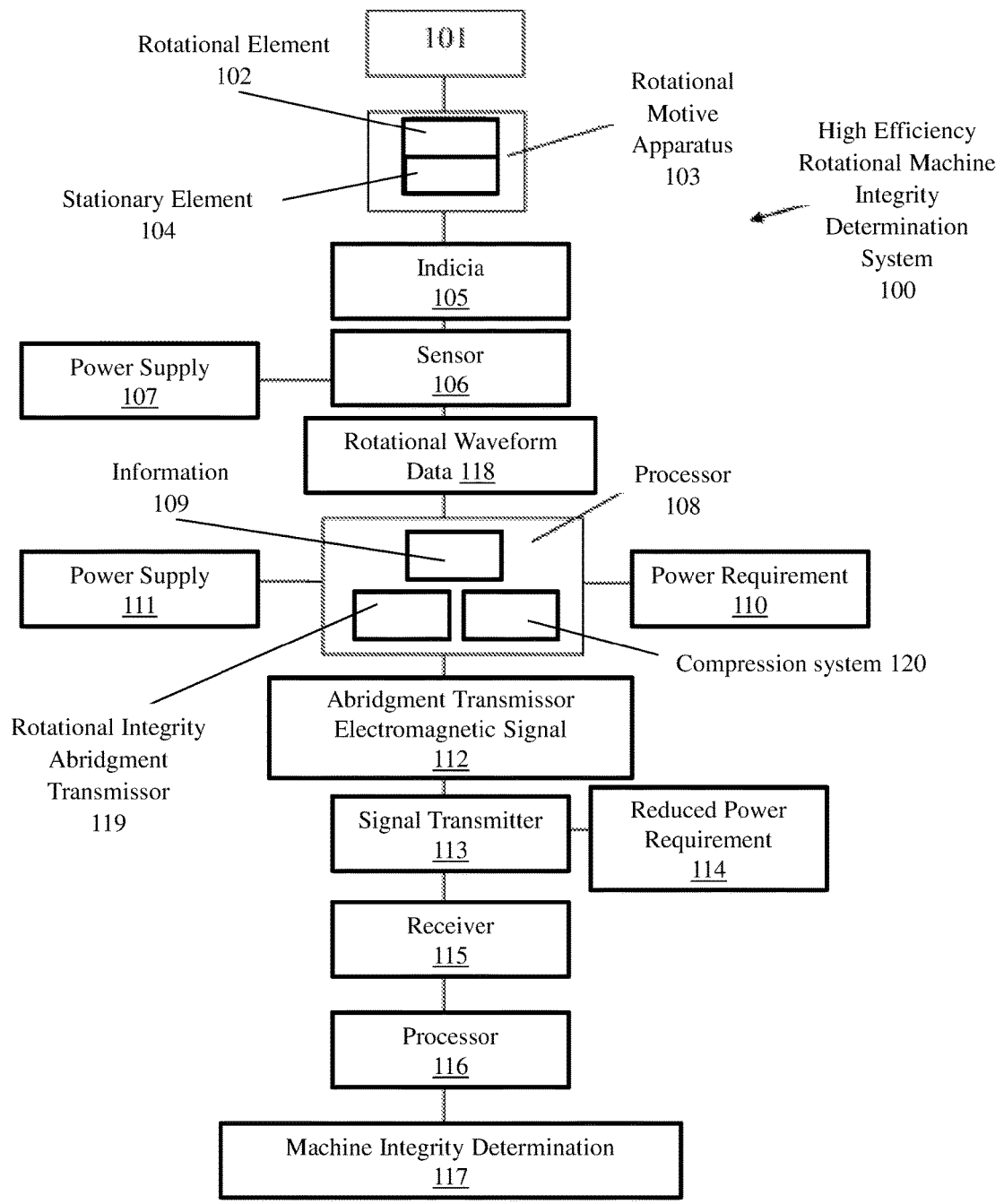
FIG. 5 is a block diagram of an alternative exemplary energy efficient system in accordance with various embodiments of the present invention.

FIG. 5 is a conceptual figure showing embodiments of the present invention such as with high efficiency rotational machine integrity determinations systems (100) which may be utilized individually or in any combination in any particular system. Energy (101) may be supplied to a rotational motive apparatus (103) which may cause mechanical rotation of a rotational element (102) of the rotational motive apparatus. A rotational motive apparatus may be a machine that functions perhaps in a periodic nature such as with a motor, using rotations or the like, and may include but is not limited to a rotating pump, a rotating electric motor, a compressor, a rotating fan, or the like. In some embodiments, an apparatus may include a condenser or even other machines or the like. A stationary element (104) may low friction support a rotational element (102) of a rotational motive apparatus. For example, a stationary element (104) may be a bearing or the like. A rotational motive apparatus (103) may cause indicia (105) perhaps as a result of various factors of the machine's operation. Indicia (105) may be any kind of information or characteristic or even indication related to a rotational motive apparatus or machine. One example of indicia (105) may be time-varying rotational indicia which may provide periodicity type information such as periodic time-varying rotational indicia, vibration information, or the like of an apparatus. Other examples of indicia (105) may include temperature, pressure, dynamic load (e.g., MWatt), speed (e.g., RMP), other process parameter characterizing behavior, perhaps even instantaneous behavior or state of a machine, or the like. Indicia of an apparatus may be sensed, on-machine sensed, or even off-machine sensed, perhaps by at least one sensor (106) such as but not limited to a time-varying rotational indicia sensor, an on-machine sensor, off-machine sensor, or the like. At least one additional sensor may sense the same or different indicia of an apparatus which may even be utilized as part of an analysis for a machine integrity determination. A sensor may be responsive to a rotational motive apparatus perhaps by sensing, directly sensing, indirectly sensing, receiving data, or the like from, by, or even relating to rotational motive apparatus operational characteristics. A sensor may have a power supply (107). By responsive, a step or element may somehow relate or may even react to another step or element and may be direct, indirect, ancillary, based on, based in part on, or the like.

Rotational waveform data (118), which may include but is not limited to current, historical, updated data, or the like, may be established from sensed indicia perhaps even sensed time-varying rotational indicia and may even be established by a sensor. Rotational waveform data may be any kind of data relating to rotations of a rotational motive apparatus including but not limited to time-domain vibration data, time-domain vibration data graphs, a frequency spectrum, vibration signature, or the like. Indicia (105) or perhaps even rotational waveform data (118) may be processed by a processor (108) which may be part of a sensor, may be an on-machine processor, may be a separate component, may be an off-machine processor, or the like. A processor (108) may provide numerous different kinds of processing, transformations, expressions, compressions, functions, or the like, as discussed herein; may be an application specific integrated circuit (ASIC); and may even generate information (109) such as transformed data, processed data, or the like. In embodiments, a processor (108) may be located on or even near a machine which may provide on-machine transforming, on machine generating, or the like processes. Alternatively, a processor may be located away from a machine. A processor or even a sensor may establish rotational waveform data, in embodiments. Rotational waveform data (118) may be transformed by a processor (108) which may be a programmed processor. In embodiments, a processor (108) may be a programmed rotational waveform data transformation processor that may provide processing perhaps at least of rotational waveform data or the like.

A rotational integrity abridgment transmissor (119) may be generated perhaps in response to transformed rotational waveform data and may even be generated by a processor (108). A rotational integrity abridgment transmissor may be data, a package of data, an assortment of data, processed data, combinations thereof, or the like, which may be reduced, shortened, changed in some fashion, or the like, and may even be responsive to a rotational motive apparatus or machine, indicia or the like. In embodiments, a rotational integrity abridgment transmissor may not include any raw data. A signal (112) may be created in response to data or a transmissor or the like. For example, a signal (112) may be an abridgment transmissor electromagnetic signal. A signal (112) may be transmitted with perhaps a signal transmitter (113) which may be capable of transmitting a signal from a rotational motive apparatus, or even from a sensor, to facilitate a machine integrity determination perhaps even based on the abridgment transmissor. A signal (112) may be received perhaps with a receiver (115) such as an abridgment transmissor signal receiver, a remote device, a handheld measuring device or the like. A signal or even a transmissor may be processed with a processor (116) such as a rotational integrity abridgment transmissor processor or even a machine integrity determination generator, a machine integrity evaluator, or the like. Processing may be off-site processing (e.g., not on or near a machine, facility, plant, or the like) or alternatively, may be on-site processing (e.g., on or even near a machine, facility, plant, or the like). In some embodiments, information in a transmissor may be compared to an element such as but not limited to reference data, historical data, table look-up data, any combination thereof, or the like perhaps in the evaluation or processing of a rotational integrity of an apparatus. Perhaps in response to the received information, a machine integrity determination (117) for a rotational motive apparatus may be established (even non-visually established as it may be based on non-visual factors) and perhaps even displayed on a device, screen, or the like or even otherwise communicated to a user or the like. A machine integrity determination may provide any kind of information that may relate to the current state of an apparatus which may even be used as a machine condition monitoring tool.

In embodiments, a signal may be transmitted a distance which may be determined by a type of transmission protocol and perhaps even a physical link layer deployed by a device, sensor or the like. In embodiments, the distance may be a short distance which may include but is not limited to up to about 10 meters, up to about 15 meters, up to about 5 meters, or the like. Of course, any distance may be used, and may be up to about 100 meters, at least about 100 meters or more, and all ranges are meant to be included in this disclosure. Specifically, using bluetooth, a signal distance may be about 10 meters. If using WiFi (e.g., IEEE802.11 . . . IEEE802.15), it may range perhaps at least about 100 meters. In other embodiments, a signal may be transmitted via a wired connection perhaps at any distance. A signal (112) and transmission thereof perhaps via a transmitter (113) may be on-demand, continuously transmitted, randomly transmitted, periodically transmitted, programmed, or the like. A signal may be transmitted fast, may be with less data or reduced data, or the like. A transmitter (119) may include data such as but not limited to differential data, compressed data, subtracted data, a frequency spectrum, curve fit data, any combination thereof, or the like.

As previously mentioned, embodiments of the present invention may address power usage and may even reduce power needs for machine condition monitoring systems. For example, embodiments of the present invention may provide systems and methods which may include energy apportioning of operational functions perhaps with an operational function energy apportioning decisional processor. As represented in FIG. 5, a processor (108) may be an operational function energy apportioning decisional processor which may apportion energy usage for operational functions perhaps by saving energy or even reducing power needs in at least in part or even substantially all of various systems, steps, or elements. For example, a processor (108) may have a power supply evaluator which may evaluate a power supply (111) available and a processor (108) may even have a power consumption determinater which may determine power consumption or perhaps even determine a power requirement (110) for functions, steps, processes, actions, or the like of a system. As such, a power consumption determinater may include but is not limited to: a time-varying rotation indicia sensor power consumption determinater which may efficiently determine a power requirement for a step of sensing time-varying rotational indicia of a rotational motive apparatus; a programmed rotational waveform data transformation processor power consumption determinater which may efficiently determine a power requirement for a step of establishing rotational waveform data from sensed time-varying rotational indicia or a step of transforming rotational waveform data by a programmed processor, or the like; an abridgement transmissor electromagnetic signal transmitter power consumption determinater which may efficiently determine a power requirement for a step of generating a rotational integrity abridgment transmissor in response to transformed rotational waveform data or a step of creating an abridgment transmissor electromagnetic signal in response to said rotational integrity abridgment transmissor or a step of transmitting said abridgment transmissor electromagnetic signal from said rotational motive apparatus to facilitate a machine integrity determination, or the like; any combination thereof; or the like.

Determination of power requirements or even power consumption may be based on the power supply available and perhaps the amount of power to be consumed or to be required which may be apportioned, adjusted, balanced, reduced, or the like perhaps even based on the needs of the system. Accordingly, a power consumption determinater may be based on a power supply evaluator, each of which may be part of a processor (108). As mentioned, a power supply may include but is not limited to a battery, power plug, sensor battery, a device battery, remote device battery, any combination thereof, or the like. For example, a power requirement (110) may be reduced, perhaps as a reduced power consumption element, for at least one activity; or a power requirement (110) may be an enhanced compression power requirement or perhaps even an enhanced transmission power requirement. Enhanced requirements may include improved, valued, modified, or the like requirements. In embodiments, a power supply may be evaluated and perhaps even a power requirement or consumption may be determined for an activity such as but not limited to: computational resources required to establish said rotational waveform data; computational resources required to transform said rotational waveform data; computational resources required to generate said rotational integrity abridgment transmissor; computational resources required to create said abridgement transmissor electromagnetic signal; computational resources required to transmit said abridgement transmissor electromagnetic signal; computational resources required to compress; computational resources required to uncompress; frequency (e.g., how often) of transformation; frequency (e.g., how often) of transmission; frequency (e.g., how often) of sensing; frequency (e.g., how often) of establishing rotational waveform data; frequency (e.g., how often) of creation of an electromagnetic signal; a compression algorithm; a decompression algorithm; transmission time; degree of transformation; degree of compression; degree of error detection; degree of error correction; degree of error control; amount of distortion introduced in said rotational abridgement transmissor; any combination thereof, or the like. Depending on the needs of a system, a power requirement or power consumption may be apportioned as appropriate.

Each device may have determined, perhaps predetermined, its own power budget for transmission and even computing purposes. This may be established during engineering perhaps as a characterization of the device. The transmission budget could be expressed, for example, in mAh/byte and the computing budget may be in mAh/cpu cycle or even mAh/second. Once a raw measurement may be acquired and perhaps business logic has been determined for transmission, a power cost may be established perhaps in total mAh for a raw measurement and perhaps also taking message overhead into account. A power cost saving's goal may need to be established. This can be done per device perhaps during installation or perhaps even based on customer input. A goal could operate as an effective threshold. If e.g., about 25% power savings was a goal, a processing step such as compression computing could need to cost about 75% or less of the raw message transmission. Business logic may include a combination of user programmable alarm levels and/or indication of spectral band criticality or some other function to establish whether or not a measurement may be notable. If it is determined that compression may be needed, a function computing the compression may need to check, perhaps regularly check, elapsed time/cycles or the like to perhaps determine if elapsed (mAh/second) >total (mAh/bytes). If a threshold is reached, the thus far compressed data may be sent. This may include partially compressed data as discussed further herein.

To make processes and systems efficient, a lookup table of the expected cost per compression function may be established during engineering characterization of the specific device. The lookup data can function as a first estimation of the expected energy cost and may help determine whether compression may be practical. Measurements may be dynamic and may include time waveform, FFT or both and can have varying length or the like.

In embodiments, machine information may be any type of data including but not limited to performance data, current data, virtual data, historical data, time-domain vibration signature data, or the like perhaps as obtained from a sensor, a plurality of sensors, a virtual sensor, a plurality of virtual sensors, a machine, a plurality of machines, a device, a plurality of devices, vibrations, machine vibrations, frequencies, machine frequencies, temperature, pressure, reported data, a signal, transmitted data, remotely transmitted data, wirelessly transmitted data, downloaded data, data received via connections, a database, any combination thereof, or the like.

Figure 4:
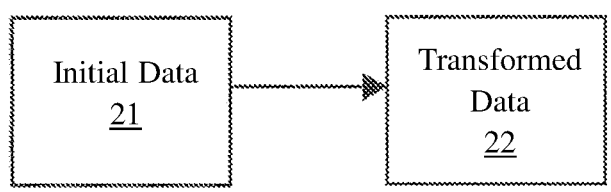
FIG. 4 is a conceptual diagram of a data transformation element where initial data is transformed into transformed data in accordance with various embodiments of the present invention.

Any type of data may be processed within a data transformation system (30), which may be part of a processor (108) to provide transformation of data from initial data (21) to transformed data (22) as shown conceptually in FIG. 4. A data transformation system (30) may include a data transformation element (6). As mentioned earlier, it may be desirable to compress the data while keeping accuracy of the measurements. An example of data transformation or even processing may include compression algorithms perhaps for data compression, source coding, bit-rate reduction, or the like which may involve encoding information using fewer bits than the original representation could use. As mentioned, compression may be helpful because it may help reduce the consumption of expensive resources, such as memory space, transmission bandwidth, battery, or the like. Compressed data may need to be decompressed perhaps with a decompression system to be used. A decompression system may be part of processor (116) as represented in FIG. 5. A design of a data compression system may involve a balance between various factors including the degree of compression, the amount of distortion introduced, and even the computational resources required to compress or even uncompress the data.

For instance, embodiments of the present invention may provide methods and systems which include compressing data perhaps based on or even responsive to rotational waveform data and perhaps with a data compression decisional processor. A processor (108) as represented in FIG. 5 may include a data compression decisional processor or the like. As mentioned above, a signal may be created and even transmitted to facilitate a machine integrity determination of a rotational motive apparatus which may be responsive to or may even include compressed data. Compression may be accomplished with a compression system (120), which may be part of a processor (108) as discussed herein. Data which may be based on, directly based on, or even indirectly based on rotational waveform data (118), may be compressed in various embodiments. Indirect basis may provide that other functions may have been performed on the rotational waveform data perhaps prior to compression. Compression of data may be part of a step including but not limited to: a step of establishing rotational waveform data; a step of transforming rotational waveform data by a programmed processor; a step of generating an rotational integrity abridgment transmissor; any combination thereof, or the like.

In embodiments, compression of data perhaps in a compression system (120) may include differentially compressing data perhaps providing a differential data compression system. Differentially compressing data may include sensing time-varying rotational indicia perhaps from at least two sensors; compressing time-varying rotational indicia sensed from a first sensor with a first compression system; and perhaps even compressing time-varying rotational indicia sensed from at least one additional sensor with at least one additional compression system that may be different from a first compression system. In embodiments, data, different data, partial data or the like may be compressed differently perhaps depending on the desired result. Thus, in some embodiments, a compression system (120) may include at least two different compression systems which may provide that at least two different compression systems may be differentially responsive to at least two different time-varying rotational indicia sensors. Alternatively, differential compression may provide compressing at least part of data with a first compression system such as a first partial data compression system; and perhaps even compressing at least one additional part of data with at least one additional compression system such as at least one additional partial data compressions system that may be different from a first partial data compression system. As further discussed herein, a compression system (120) may include but is not limited to a complete data compression, a partial data compression, a parallel compression, a succession compression, a serial compression, a lossless data compression, a lossy data compression, compression lookup systems, any combination thereof, or the like. As also discussed herein, a transmissor (119) may be a compressed data transmissor in some embodiments.

Due to compression or perhaps other processing or even transformation, transmission of data may provide a reduced power requirement (114) such as a reduced power consumption transmitter or the like in that it may take less power to achieve a transmission. A compressed data electromagnetic signal may be below a data power consumption limit which may be dynamically set and may be based on power supply and power needs. In general, an amount of power utilized to compress data and perhaps even transmit the data may be evaluated. A threshold may be established as a dynamic threshold perhaps that it may change as evaluated and even re-evaluated. A processor, device, or even a sensor which may accomplish a compression or perhaps other processing may also operate a function that may determine how much energy has been spent in compression or processing thus far and can terminate the task perhaps if compression or processing energy may overtake needed transmission energy. In some embodiments, a lookup table per device type may need to be established perhaps so that it can relate specific data to be transmitted to the amount of permitted compression or processing or the like. Accordingly, embodiments of the present invention may provide establishing a power requirement threshold for compressing data (e.g., a compression power consumption threshold) which may be dynamically established (e.g., a dynamic compression power consumption threshold) as the power requirement threshold may be re-established or even re-calculated or the like so that compression may continue until a threshold is met. A power requirement threshold may be based on a power transmission requirement and may be a machine specific power requirement threshold. A power requirement threshold may be based on a table reference, user input, or the like.

In embodiments, methods and systems of the present invention may provide intelligently hierarchically ranking data based on, directly based on, indirectly based on, or even responsive to rotational waveform data or other data or the like perhaps with an intelligent hierarchical data ranking element. A processor (108) may include an intelligent hierarchical data ranking decisional processor as mentioned herein. A processor (108) may be responsive to an intelligent hierarchical data ranking element which may be any kind of direction, including user input, function, algorithm, or the like that may set priorities perhaps even dynamic priorities for ranking of data. Accordingly, an intelligent hierarchical data ranking element may be part of a processor (108) in some embodiments. A processor may rank data, may provide a listing, categories or perhaps even groupings of data or the like, such as but not limited to high ranked data and/or even low ranked data or the like. Information (109) as represented in FIG. 5 may include hierarchically ranked data, high ranked data, low ranked data, or the like.

Systems and methods may then utilize ranked data when processing data, transforming data, compressing data, or the like perhaps such that a programmed rotational waveform data transformation processor may be responsive to an intelligent hierarchical data element. In embodiments, a data compression system (120) may compress at least part of data in response an intelligently hierarchically rank of data thus providing a partial data compression system. As a non-limiting example, perhaps only high ranked data may be compressed or otherwise processed such as with a high ranked data compression system or data may be compresses or otherwise processed until it may reach a certain power requirement threshold, or the like. In other embodiments, at least part of ranked data may be compressed or otherwise processed by one system and other parts of ranked data may be compressed by another system. Compression may occur hierarchically (e.g., process through the ranked listing) perhaps until a threshold is met such as a power requirement threshold or the like. As a non-limiting example, a data compression system may provide a lossless compression system of at least part of high ranked data such that perhaps lossless compression of at least part of high ranked data may be achieved. A data compression system may provide a lossy compression system of at least part of low ranked data (or perhaps any other data). Lossless compression and lossy compression are further discussed herein.

Figure 6:
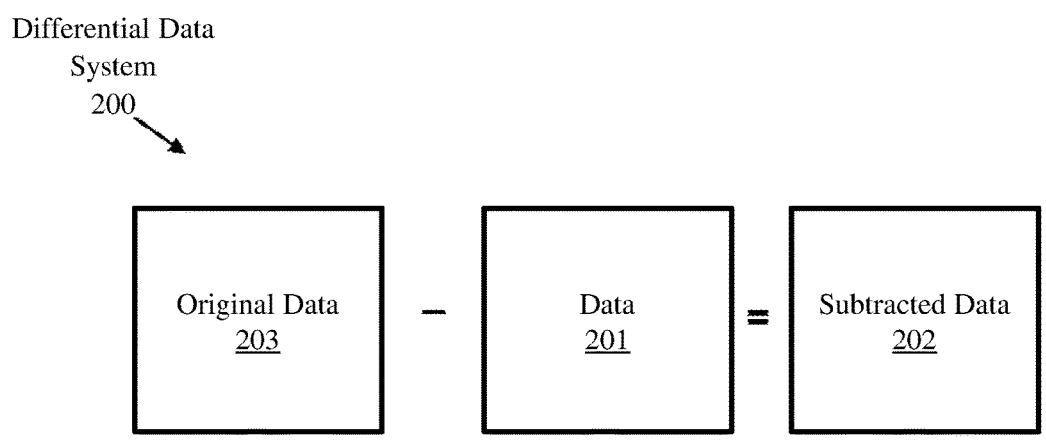
FIG. 6 is a conceptual diagram of an example of a differential data system in accordance with various embodiments of the present invention.

In yet other embodiments, methods and systems of the present invention may include generating differential data perhaps based on, directly based on, indirectly based on, or even responsive to rotational waveform data and perhaps even by a programmed processor. As represented in FIG. 5, a processor (108) may be a differential data processor and perhaps even information (109) may include differential data. Differential data may be established as part of any step of a system including but not limited to: establishing rotational waveform data from sensed time-varying rotational indicia; transforming rotational waveform data by a programmed processor; generating a rotational integrity abridgement transmissor in response to transformed rotational waveform data; any combination thereof, or the like. A differential data system (200) may provide differential data which may be data that has been changed or somehow different than in its original form. For example, rotational waveform data may be modified, reduced, or the like to create differential data or the like. In embodiments, differential data may be subtracted data perhaps where data has been subtracted therefrom. For example, original data (203), such as rotational waveform data may be subtracted by data (201) or other functions to perhaps establish a differential data result such as a subtracted data (202) as represented in FIG. 6. Data (201) may include but is not limited to historical data, standard data, curve fit data, reference data, any combination thereof, or the like. In embodiments, a reference frequency spectrum may be subtracted from a new frequency spectrum to create differential data. In other embodiments, reference curve fit data may be subtracted from a new curve fit data to create differential data. Curve fitting may be the process of constructing a curve or mathematical function that has the best fit to a series of data points perhaps subject to constraints. It may involve interpolation where an exact fit to the data may be required or may involve smoothing where a function may be constructed that approximately fits the data or may even involve extrapolation where the use of a curve may go beyond a range of observed data. It may involve first degree, second degree, third degree, fourth degree, or higher polynomials, curves, constraints, equations or the like. It may even involve trigonometric functions (e.g., sine or cosine), conic sections, algebraic, geometric, or the like analysis.

Differential data may be compressed such as with a differential compression system, as discussed herein, or may even be utilized as rotational motive apparatus operational information perhaps even to establish an integrity motor determination or the like. A rotational integrity abridgment transmissor (119) may include or may even be responsive to at least some differential data or even compressed differential data perhaps that it may provide a differential data transmissor.

To that end, embodiments of the present invention may provide data transformation through data compression by successively subtracting a set of data such as waveforms, spectra, or the like until a remainder signal may be below a threshold. The data used for transmission, or processing, or the like may only be the envelope data of the reference data such as the reference waveform or spectra which may provide a frequency, amplitude, phase, decay, or the like.

Embodiments of the present invention may provide data transformation or data processing by determining a difference between a current waveform (or other type data) and a previous waveform (or other type data) or even a current spectrum and previous spectrum where the data relating to the difference may be what is processed, transmitted, or the like. The data related to the differences may be less than the original data, waveform, spectrum or the like. Thus, the processing or even the transmission of the data related to the differences may be shorter, may take less time to transmit or even process, and may even use less power. Data that relates to a difference may be any data that has been reduced in amount in any way.

Transformed or processed data may even provide better data points for later processing, analyzing, or the like perhaps because less information may be used in the calculations, processing, etc. During the transformation process, some information such as excess information, undesirable information, or even unnecessary information may be removed to provide a better data sample for analysis.

As mentioned, lossless data compression, lossy data compression, or combinations of the two may be used in a data transformation element or system in embodiments of the present invention. Lossless data compression may make use of data compression algorithms that may allow the exact or substantially important portions of original data to be reconstructed from the compressed data. This can be contrasted to lossy data compression, which may not allow the exact original data to be reconstructed from the compressed data. Lossless data compression may be used in formats such as represented and conceptually understood from examples like a ZIP file format and in the UNIX tool gzip, or the like. It may also be used as a component within lossy data compression technologies. Lossless compression may be used when it may be important that the original and the decompressed data be identical, or perhaps when no assumption can be made on whether certain deviation may be uncritical. Lossless compression programs may use different kinds of algorithms. Conceptually, it may be understood how but one example may generate a statistical model for the input data, and perhaps another may map the input data to bit strings using this model in such a way that "probable" (e.g. frequently encountered) data may produce shorter output than "improbable" data. Statistical modeling algorithms for text (or text-like binary data such as executables) may similarly be conceptually understood from such examples as Burrows-Wheeler transform (BWT; block sorting preprocessing that makes compression more efficient), LZ77 (used by Deflate), LZW, PPM, and the like. Encoding algorithms to produce bit sequences may conceptually be understood from examples such as Huffman coding (also used by Deflate), Arithmetic coding, and the like.

A lossy data compression method may compress data and then decompress it to retrieve data that may well be different from the original, but may be close enough to be useful in some way. These may be referred to as codecs in this context. Some basic lossy compression schemes may include but are not limited to: (1) in lossy transform codecs, samples of data may be taken, chopped into small segments, transformed into a new basis space, and quantized. The resulting quantized values may then be entropy coded; or (2) in lossy predictive codecs, previous and/or subsequent decoded data may be used to predict the current data sample. An error between the predicted data and the real data, together with any extra information needed to reproduce the prediction, may then be quantized and coded. In some systems the two techniques may be combined, perhaps with transform codecs being used to compress the error signals generated by the predictive stage.

In embodiments, the present invention may provide data transformation or even data processing through data compression using a look up table whereby a X bit data sample may be transformed into a Y bit data sample where X<Y. Examples of compression lookup systems include uLaw (µ-law algorithm) or aLaw, or the like. A compression lookup system may include a compounding algorithm which may reduce the dynamic range of a signal.

As mentioned, in embodiments, the present invention may provide data transformation through data compression of a current waveform (or other type data such as current spectrum) and a set up known reference waveforms (or other type data such as reference spectra). The reference data such as the reference waveforms or reference spectra can be fixed, can be created upon installation or can even be dynamically changed during operation.

In embodiments, the present invention may provide data transformation of data perhaps by pure mathematical transformation. A conceptual example includes Fourier transformation of data. This may conceptually include mapping of a function, perhaps as a signal that may be defined in one domain, as space or time, into another domain, as wavelength or frequency, where the function may be represented in terms of sines and cosines or other constructs. This may provide an easier and efficient transmission of data while providing similar if not the same data after transmission.

In embodiments, the present invention may provide a decrease in power consumption during machine condition monitoring systems by decreasing the amount of resources used in error detection and correction. Error detection and correction or error control are techniques that may enable reliable delivery of digital data over unreliable communication channels. Communication channels may be subject to channel noise and errors may be introduced during transmission from a source to a receiver (e.g., between the machine, device, sensors, or the like). Error detection techniques may allow detecting of such errors while error correction may enable reconstruction of the original data. Error-detection and correction schemes can be systematic or even non-systematic: In a systematic scheme, a transmitter sends an original data, and may attach a fixed number of check bits (or parity data), which may be derived from the data bits by some deterministic algorithm. If only error detection may be required, a receiver can simply apply the same algorithm to the received data bits and compare its output with the received check bits; if the values do not match, an error has occurred at some point during the transmission. In a system that uses a non-systematic code, the original message may be transformed into an encoded message that has at least as many bits as the original message.

Error correction may be realized by automatic repeat request (ARQ) (sometimes also referred to as backward error correction) which may be an error control technique whereby an error detection scheme may be combined with requests for retransmission of erroneous data. Every block of data received may be checked using the error detection code used, and if the check fails, retransmission of the data may be requested—this may be done repeatedly, until the data can be verified. Alternatively, error correction may be realized by forward error correction (FEC) where the sender may encode the data using an error-correcting code (ECC) prior to transmission. The additional information (redundancy) added by the code may be used by the receiver to recover the original data. In general, the reconstructed data may be what is deemed the most likely original data.

Error detection and correction efforts may be decreased if the transmission data being sent has been compressed or somehow transformed so that less data may be transmitted. Thus, the transmission data may be more accurate and may not need error detection at least to the extent that it would be needed with untransformed or even uncompressed data. A reduction in power consumption may result since less processing, less transmission, and even less power supply may be needed. In addition, more energy efficient error checking protocols can be applied.

In embodiments, the present invention may provide data transformation by applying one of any of the systems or methods as discussed herein to all or even part of the data such as the waveform or spectrum data and then applying a different system or method to another part of the data such as the waveform or spectrum data. Embodiments of the present invention may include one, two, three, four, or more different transformation systems or methods as applied to data such as a waveform or spectra data and may even be applied in part, individually, in parallel, in succession, serially, or the like.

The various embodiments of the present invention may include a data storage module that can receive and store data or other information; a data analyzer module which may be in communication with the data storage module; and perhaps a computer or computational device of some type. The data storage module may be any nonvolatile or even volatile memory storage device, such as a hard drive, magnetic tape, etc. The data storage module may have one or more databases for storing data. A computer or device may have a programmable or even application specific processor that may be in communication with a data storage module and a data analyzer module. A central processor may coordinate communications between a data analyzer module and a data storage module, and may generally aid in the processing of data. A data analyzer module may consist of one or more software/hardware or firmware components for analyzing data to produce visual displays of the data or results which may assist machine maintenance personnel in identifying and correcting or transforming machine operational problems or defects or even monitoring tasks or sequences.

It should be understood that the structure of the system as depicted in FIGS. 3, 4, 5 and 6 are only exemplary of general systems in accordance with some embodiments of the present invention. More particularly, it will be apparent to a person of ordinary skill in the relevant technology that that the system may use various modules, software, subroutines, programs, sensors, techniques, or the like to accomplish the energy efficient machine condition monitoring system. Each of the calculations, transformations, results, displays and the like as discussed herein may be embodied in a software program, subroutines, programs, and the like.

Representative claims may include the following clauses:

1. A method of high efficiency rotational machine integrity determination comprising the steps of:
   supplying energy to a rotational motive apparatus;
   causing mechanical rotation of a rotational element of said rotational motive apparatus;
   low friction supporting said rotational element by a stationary element of said rotational motive apparatus;
   causing a time-varying rotational indicia from said rotational motive apparatus;
   sensing said time-varying rotational indicia of said rotational motive apparatus;
   energy apportioning operational functions;
   creating a signal; and
   transmitting said signal from said rotational motive apparatus to facilitate a machine integrity determination.

2. A method of high efficiency rotational machine integrity determination according to clause 1, or any other clause, wherein said step of creating said signal comprises the step of creating an abridgment transmissor electromagnetic signal.

3. A method of high efficiency rotational machine integrity determination comprising the steps of:
   supplying energy to a rotational motive apparatus;
   causing mechanical rotation of a rotational element of said rotational motive apparatus;
   low friction supporting said rotational element by a stationary element of said rotational motive apparatus;
   causing a time-varying rotational indicia from said rotational motive apparatus;
   sensing said time-varying rotational indicia of said rotational motive apparatus;
   establishing rotational waveform data from said sensed time-varying rotational indicia;
   compressing data responsive to said rotational waveform data;
   creating an abridgment transmissor electromagnetic signal; and
   transmitting said abridgment transmissor electromagnetic signal from said rotational motive apparatus to facilitate a machine integrity determination.

4. A method of high efficiency rotational machine integrity determination comprising the steps of:
   supplying energy to a rotational motive apparatus;
   causing mechanical rotation of a rotational element of said rotational motive apparatus;
   low friction supporting said rotational element by a stationary element of said rotational motive apparatus;
   causing a time-varying rotational indicia from said rotational motive apparatus;
   sensing said time-varying rotational indicia of said rotational motive apparatus;
   establishing rotational waveform data from said sensed time-varying rotational indicia;
   intelligently hierarchically ranking data based on said rotational waveform data;
   transforming said rotational waveform data by a programmed processor;
   creating an abridgment transmissor electromagnetic signal; and
   transmitting said abridgment transmissor electromagnetic signal from said rotational motive apparatus to facilitate a machine integrity determination.

5. A method of high efficiency rotational machine integrity determination comprising the steps of:
   supplying energy to a rotational motive apparatus;
   causing mechanical rotation of a rotational element of said rotational motive apparatus;
   low friction supporting said rotational element by a stationary element of said rotational motive apparatus;
   causing a time-varying rotational indicia from said rotational motive apparatus;
   sensing said time-varying rotational indicia of said rotational motive apparatus;
   establishing rotational waveform data from said sensed time-varying rotational indicia;
   generating differential data by a programmed processor;
   creating an abridgment transmissor electromagnetic signal; and
   transmitting said abridgment transmissor electromagnetic signal from said rotational motive apparatus to facilitate a machine integrity determination.

6. A method of high efficiency rotational machine integrity determination comprising the steps of:
   supplying energy to a rotational motive apparatus;
   causing mechanical rotation of a rotational element of said rotational motive apparatus;

low friction supporting said rotational element by a stationary element of said rotational motive apparatus;
causing a time-varying rotational indicia from said rotational motive apparatus;
sensing said time-varying rotational indicia of said rotational motive apparatus;
establishing rotational waveform data from said sensed time-varying rotational indicia;
transforming said rotational waveform data by a programmed processor;
generating a rotational integrity abridgment transmissor in response to said transformed rotational waveform data;
creating an abridgment transmissor electromagnetic signal in response to said rotational integrity abridgment transmissor; and
transmitting said abridgment transmissor electromagnetic signal from said rotational motive apparatus to facilitate a machine integrity determination.

7. A method of high efficiency rotational machine integrity determination according to clause 6, or any other clause, and further comprising the step of energy apportioning operational functions for said method.

8. A method of high efficiency rotational machine integrity determination according to clause 7, or any other clause, wherein said step of energy apportioning operational functions comprises the step of efficiently determining a power requirement for a step selected from a group consisting of:
said step of sensing said time-varying rotational indicia of said rotational motive apparatus;
said step of establishing rotational waveform data from said sensed time-varying rotational indicia;
said step of transforming said rotational waveform data by a programmed processor;
said step of generating a rotational integrity abridgment transmissor in response to said transformed rotational waveform data;
said step of creating an abridgment transmissor electromagnetic signal in response to said rotational integrity abridgment transmissor;
said step of transmitting said abridgment transmissor electromagnetic signal from said rotational motive apparatus to facilitate a machine integrity determination; and
any combination thereof.

9. A method of high efficiency rotational machine integrity determination according to clause 7, or any other clause, wherein said step of energy apportioning operational functions for said method comprises the step of determining power requirements based on a type of power supply.

10. A method of high efficiency rotational machine integrity determination according to clause 7, or any other clause, wherein said step of energy apportioning operational functions comprises the step of evaluating a power supply and determining a power requirement for an activity selected from a group consisting of:
computational resources required to establish said rotational waveform data;
computational resources required to transform said rotational waveform data;
computational resources required to generate said rotational integrity abridgment transmissor;
computational resources required to create said abridgment transmissor electromagnetic signal;
computational resources required to transmit said abridgment transmissor electromagnetic signal;
computational resources required to compress;
computational resources required to uncompress;
frequency of transformation;
frequency of transmission;
frequency of sensing;
frequency of establishing rotational waveform data;
frequency of creation of an electromagnetic signal;
a compression algorithm;
a decompression algorithm;
transmission time;
degree of transformation;
degree of compression;
degree of error detection;
degree of error correction;
degree of error control;
amount of distortion introduced in said rotational abridgment transmissor; and
any combination thereof.

11. A method of high efficiency rotational machine integrity determination according to clause 10, or any other clause, wherein said step of evaluating a power supply and determining a power requirement for said activity comprises the step of reducing said power requirement for at least one of said activities.

12. A method of high efficiency rotational machine integrity determination according to clause 7, or any other clause, wherein said step of energy apportioning operational functions for said method comprises the step of determining an enhanced compression power requirement and an enhanced transmission power requirement based on a power supply.

13. A method of high efficiency rotational machine integrity determination according to clause 9, 10, or 12, or any other clause, wherein said power supply is selected from a group consisting of a battery, a power plug, a sensor battery, device battery, a remote device battery, and any combination thereof.

14. A method of high efficiency rotational machine integrity determination according to clause 6, or any other clause, and further comprising the step of compressing data based on said rotational waveform data with a compression system.

15. A method of high efficiency rotational machine integrity determination according to clause 14, or any other clause, wherein said step of compressing data based on said rotational waveform data with a compression system comprises the step of compressing data directly based on said rotational waveform data with a compression system.

16. A method of high efficiency rotational machine integrity determination according to clause 14, or any other clause, wherein said step of compressing data based on said rotational waveform data with a compression system comprises the step of compressing data indirectly based on said rotational waveform data with a compression system.

17. A method of high efficiency rotational machine integrity determination according to clause 14, or any other clause, wherein said step of compressing said data comprises the step of compressing said data as part of a step selected from a group consisting of:
said step of establishing said rotational waveform data;
said step of transforming said rotational waveform data by said programmed processor;
said step of generating said rotational integrity abridgment transmissor; and
any combination thereof.

18. A method of high efficiency rotational machine integrity determination according to clause 14, or any other clause, wherein said step of compressing said data comprises the step of differentially compressing said data.
19. A method of high efficiency rotational machine integrity determination according to clause 18, or any other clause, wherein said step of differentially compressing said data comprises the steps of:
    sensing time-varying rotational indicia from at least two sensors;
    compressing said time-varying rotational indicia sensed from a first sensor with a first compression system; and
    compressing said time-varying rotational indicia sensed from at least one additional sensor with at least one additional compression system that is different from said first compression system.
20. A method of high efficiency rotational machine integrity determination according to clause 18, or any other clause, wherein said step of differentially compressing said data comprises the steps of:
    compressing at least part of said data with a first compression system; and
    compressing at least one additional part of said data with at least one additional compression system.
21. A method of high efficiency rotational machine integrity determination according to clause 14, 19, or 20, or any other clause, wherein said compression system is selected from a group consisting of a complete data compression, a partial data compression, a parallel compression, a succession compression, a serial compression, a lossless data compression, a lossy data compression, compression lookup systems, and any combination thereof.
22. A method of high efficiency rotational machine integrity determination according to clause 14, or any other clause, wherein said step of transmitting said abridgment transmissor electromagnetic signal from said rotational motive apparatus to facilitate said machine integrity determination comprises the step of transmitting a compressed data electromagnetic signal from said rotational motive apparatus to facilitate said machine integrity determination.
23. A method of high efficiency rotational machine integrity determination according to clause 14, or any other clause, and further comprising the step of providing a reduced power requirement for transmission of compressed data generated by said step of compressing said data.
24. A method of high efficiency rotational machine integrity determination according to clause 14, or any other clause, and further comprising the step of establishing a power requirement threshold for said step of compressing said data.
25. A method of high efficiency rotational machine integrity determination according to clause 24, or any other clause, wherein said step of establishing a power requirement threshold for said step of compressing said data comprises the step of dynamically establishing a power requirement threshold for said step of compressing said data.
26. A method of high efficiency rotational machine integrity determination according to clause 24 or 25, or any other clause, wherein said step of establishing a power requirement threshold for said step of compressing said data comprises the step of compressing said data until said threshold is met.
27. A method of high efficiency rotational machine integrity determination according to clause 24, or any other clause, wherein said step of establishing a power requirement threshold for said step of compressing said data comprises the step of establishing a power requirement threshold based on a power transmission requirement.
28. A method of high efficiency rotational machine integrity determination according to clause 25, or any other clause, wherein said step of dynamically establishing a power requirement threshold for said step of compressing said data comprises the step of re-establishing said power requirement threshold throughout said step of compressing said data.
29. A method of high efficiency rotational machine integrity determination according to clause 24, or any other clause, wherein said step of establishing said power requirement threshold for said step of compressing said data comprises the step of establishing a machine specific power requirement threshold for said step of compressing said data.
30. A method of high efficiency rotational machine integrity determination according to clause 24, or any other clause, wherein said step of establishing a power requirement threshold for said step of compressing said data comprises the step of establishing a power requirement threshold based on a table reference.
31. A method of high efficiency rotational machine integrity determination according to clause 24, or any other clause, wherein said step of establishing a power requirement threshold for said step of compressing said data is based on user input.
32. A method of high efficiency rotational machine integrity determination according to clause 6, or any other clause, and further comprising the step of intelligently hierarchically ranking data based on said rotational waveform data.
33. A method of high efficiency rotational machine integrity determination according to clause 32, or any other clause, wherein said step of intelligently hierarchically ranking data based on said rotational waveform data comprises the step of intelligently hierarchically ranking data directly based on said rotational waveform data.
34 A method of high efficiency rotational machine integrity determination according to clause 32, or any other clause, wherein said step of intelligently hierarchically ranking data based on said rotational waveform data comprises the step of intelligently hierarchically ranking data indirectly based on said rotational waveform data.
35. A method of high efficiency rotational machine integrity determination according to clause 32, or any other clause, wherein said step of transforming said rotational waveform data by a programmed processor comprises the step of transforming said rotational waveform data by a programmed processor in response to said step of intelligently hierarchically ranking data based on said rotational waveform data.
36. A method of high efficiency rotational machine integrity determination according to clause 32, or any other clause, and further comprising the step of compressing at least part of said data in response to step of intelligently hierarchically ranking said data.
37. A method of high efficiency rotational machine integrity determination according to clause 36, or any other clause, wherein said step of compressing said at least part of said data in response to said step of intelligently hierarchically ranking said data comprises the step of compressing said at least part of said data in response to high ranked data.
38. A method of high efficiency rotational machine integrity determination according to clause 36 or 37, or any other clause, wherein said step of compressing at least part of said data in response to said step of intelligently hierarchically ranking said data comprises the step of hierarchically compressing said data until reaching a power requirement threshold.
39. A method of high efficiency rotational machine integrity determination according to clause 36, or any other clause, wherein said step of compressing at least part of said data in response to said step of intelligently hierarchically ranking said data comprises the step of lossless compressing at least part of high ranked data and lossy compressing at least part of low ranked data.
40. A method of high efficiency rotational machine integrity determination according to clause 6, or any other clause, and further comprising the step of generating differential data based on said rotational waveform data.
41. A method of high efficiency rotational machine integrity determination according to clause 40, or any other clause, wherein said step of generating differential data based on said rotational waveform data comprises the step of generating differential data directly based on said rotational waveform data.
42. A method of high efficiency rotational machine integrity determination according to clause 40, or any other clause, wherein said step of generating differential data based on said rotational waveform data comprises the step of generating differential data indirectly based on said rotational waveform data.
43. A method of high efficiency rotational machine integrity determination according to clause 40, or any other clause, wherein said step of generating said differential data comprises the step of generating said differential data as part of a step selected from a group consisting of:
    establishing said rotational waveform data from said sensed time-varying rotational indicia;
    transforming said rotational waveform data by said programmed processor;
    generating a rotational integrity abridgment transmissor in response to said transformed rotational waveform data; and
    any combination thereof.
44. A method of high efficiency rotational machine integrity determination according to clause 40, or any other clause, wherein said step of generating said differential data comprises the step of generating subtracted data.
45. A method of high efficiency rotational machine integrity determination according to clause 44, or any other clause, wherein said step of generating said subtracted data comprises the step of subtracting data based on said rotational waveform data from an element selected from a group consisting of historical data, standard data, curve fit data, reference data, and any combination thereof.
46. A method of high efficiency rotational machine integrity determination according to clause 40 or 44, or any other clause, and further comprising the step of compressing said differential data.
47. A method of high efficiency rotational machine integrity determination according to clause 40, or any other clause, and further comprising the step of utilizing said differential data as rotational motive apparatus operational information.
48. A method of high efficiency rotational machine integrity determination according to clause 40, or any other clause, wherein said rotational integrity abridgment transmissor comprises at least some of said differential data.
49. A method of high efficiency rotational machine integrity determination according to clause 48, or any other clause, wherein said step of transmitting said abridgment transmissor electromagnetic signal to facilitate a machine integrity determination comprises the step of transmitting said abridgment transmissor electromagnetic signal to facilitate a machine integrity determination based at least in part on said differential data.
50. A method of high efficiency rotational machine integrity determination according to clause 6, or any other clause, wherein said rotational integrity abridgment transmissor does not include any raw data.
51. A method of high efficiency rotational machine integrity determination according to clause 6, or any other clause, wherein said step of transmitting said abridgment transmissor electromagnetic signal from said rotational motive apparatus to facilitate said machine integrity determination comprises the step of transmitting said abridgment transmissor electromagnetic signal a short distance.
52. A method of high efficiency rotational machine integrity determination according to clause 6, or any other clause, wherein said step of transmitting said abridgment transmissor electromagnetic signal from said rotational motive apparatus to facilitate said machine integrity determination comprises the step of transmitting said abridgment transmissor electromagnetic signal on demand.
53. A method of high efficiency rotational machine integrity determination according to clause 6, or any other clause, wherein said step of transmitting said abridgment transmissor electromagnetic signal from said rotational motive apparatus to facilitate said machine integrity determination comprises the step of transmitting said abridgment transmissor electromagnetic signal with less data.
54. A method of high efficiency rotational machine integrity determination according to clause 51, or any other clause, wherein said short distance is selected from a group consisting of up to about 5 meters, up to about 10 meters, and up to about 15 meters.
55. A method of high efficiency rotational machine integrity determination according to clause 6, or any other clause, wherein said step of generating said rotational integrity abridgment transmissor comprises the step of generating a rotational integrity abridgment transmissor from data selected from a group consisting of compressed data, subtracted data, a frequency spectrum, curve fit data, and any combination thereof.
56. A method of high efficiency rotational machine integrity determination according to clause 44, or any other clause, wherein said step of generating subtracting data comprises the step of subtracting a reference frequency spectrum from a new frequency spectrum based on said rotational waveform data.
57. A method of high efficiency rotational machine integrity determination according to clause 6, or any other clause, and further comprising the step of processing said rotational integrity transmissor.
58. A method of high efficiency rotational machine integrity determination according to clause 57, or any other clause, wherein said step of processing said rotational integrity transmissor comprises the step of off site processing said rotational integrity transmissor.
59. A method of high efficiency rotational machine integrity determination according to clause 6, or any other clause, wherein said time-varying rotational indicia comprises periodic time-varying rotational indicia.
60. A method of high efficiency rotational machine integrity determination according to clause 6, or any other clause, and further comprising the step of receiving said abridged rotational transmissor electromagnetic signal.
61. A method of high efficiency rotational machine integrity determination according to clause 60, or any other clause, wherein said step of receiving said abridged rotational transmissor electromagnetic signal comprises the step of receiving said abridged rotational transmissor electromagnetic signal on hand-held measuring device.

62. A method of high efficiency rotational machine integrity determination according to clause 60, or any other clause, and further comprising the step of evaluating a rotational integrity in response to said received abridged rotational transmissor electromagnetic signal.

63. A method of high efficiency rotational machine integrity determination according to clause 62, or any other clause, wherein said step of evaluating said rotational integrity in response to said received abridged rotational transmissor electromagnetic signal comprises the step of comparing information in said abridged rotational transmissor with an element selected from a group consisting of reference data, historical data, table look-up data, and any combination thereof.

64. A method of high efficiency rotational machine integrity determination according to clause 6, or any other clause, and further comprising the step of establishing said machine integrity determination for said rotational motive apparatus.

65. A method of high efficiency rotational machine integrity determination according to clause 64, or any other clause, wherein said step of establishing said machine integrity determination for said rotational motive apparatus comprises the step of non-visually establishing said machine integrity determination for said rotational motive apparatus.

66. A method of high efficiency rotational machine integrity determination according to clause 6, or any other clause, wherein said programmed processor comprises an application specific integrated circuit (ASIC).

67. A method of high efficiency rotational machine integrity determination according to clause 6, or any other clause, wherein said rotational motive apparatus comprises a rotating pump.

68. A method of high efficiency rotational machine integrity determination according to clause 6, or any other clause, wherein said rotational motive apparatus comprises a rotating electric motor.

69. A method of high efficiency rotational machine integrity determination according to clause 6, or any other clause, wherein said rotational motive apparatus comprises a compressor.

70. A method of high efficiency rotational machine integrity determination according to clause 6, or any other clause, wherein said rotational motive apparatus comprises a rotating fan.

71. A method of high efficiency rotational machine integrity determination according to clause 6, or any other clause, wherein said step of sensing said time-varying rotational indicia from said rotational motive apparatus comprises the step of on-machine sensing said time-varying rotational indicia from said rotational motive apparatus.

72. A method of high efficiency rotational machine integrity determination according to clause 6, or any other clause, wherein said step of transforming said rotational waveform data by a programmed processor comprises the step of on-machine transforming said rotational waveform data by a programmed processor.

73. A method of high efficiency rotational machine integrity determination according to clause 6, or any other clause, wherein said step of generating a rotational integrity abridgment transmissor comprises the step of on-machine generating a rotational integrity abridgment transmissor.

74. A method of high efficiency rotational machine integrity determination according to clause 6, or any other clause, wherein said step of transmitting said abridgment transmissor electromagnetic signal from said rotational motive apparatus to facilitate said machine integrity determination comprises the step of transmitting said abridgment transmissor electromagnetic signal from a sensor on said rotational motive apparatus to facilitate said machine integrity determination.

75. A method of high efficiency rotational machine integrity determination according to clause 6, or any other clause, wherein said rotational motive apparatus is part of an interdependent process.

76. A method of high efficiency rotational machine integrity determination according to clause 6 or 75, or any other clause, wherein said rotational motive apparatus comprises a plurality of rotational motive apparatuses.

77. A method of high efficiency rotational machine integrity determination according to clause 6, or any other clause, wherein said step of low friction supporting said rotational element by said stationary element of said rotational motive apparatus comprises the step of low friction supporting said rotational element with a bearing.

78. A method of high efficiency rotational machine integrity determination according to clause 6, or any other clause, and further comprising the step of sensing at least one additional indicia of said rotational motive apparatus.

79. A method of high efficiency rotational machine integrity determination according to clause 14, or any other clause, and further comprising the step of decompressing transmitted data.

80. A high efficiency rotational machine integrity determination system comprising:
a time-varying rotational indicia sensor responsive to a rotational motive apparatus;
an operational function energy apportioning decisional processor;
a signal; and
a signal transmitter capable of transmitting said signal from said rotational motive apparatus to facilitate a machine integrity determination.

81. A high efficiency rotational machine integrity determination system according to clause BPa1, or any other clause, wherein said signal comprises an abridgment transmissor electromagnetic signal.

82. A high efficiency rotational machine integrity determination system comprising:
a time-varying rotational indicia sensor responsive to a rotational motive apparatus;
rotational waveform data established by said time-varying rotational indicia sensor;
a data compression decisional processor;
an abridgment transmissor electromagnetic signal; and
an abridgment transmissor electromagnetic signal transmitter capable of transmitting said abridgment transmissor electromagnetic signal from said rotational motive apparatus to facilitate a machine integrity determination.

83. A high efficiency rotational machine integrity determination system comprising:
a time-varying rotational indicia sensor responsive to a rotational motive apparatus;
rotational waveform data established by said time-varying rotational indicia sensor;
an intelligent hierarchical data ranking decisional processor;

a programmed rotational waveform data transformation processor;
an abridgment transmissor electromagnetic signal; and
an abridgment transmissor electromagnetic signal transmitter capable of transmitting said abridgment transmissor electromagnetic signal from said rotational motive apparatus to facilitate a machine integrity determination.

84. A high efficiency rotational machine integrity determination system comprising:
a time-varying rotational indicia sensor responsive to a rotational motive apparatus;
rotational waveform data established by said time-varying rotational indicia sensor;
differential data generated by a programmed data transformation processor;
an abridgment transmissor electromagnetic signal; and
an abridgment transmissor electromagnetic signal transmitter capable of transmitting said abridgment transmissor electromagnetic signal from said rotational motive apparatus to facilitate a machine integrity determination.

85. A high efficiency rotational machine integrity determination system comprising:
a time-varying rotational indicia sensor responsive to a rotational motive apparatus;
rotational waveform data established by said time-varying rotational indicia sensor;
a programmed rotational waveform data transformation processor;
a rotational integrity abridgment transmissor generated by said programmed rotational waveform data transformation processor;
an abridgment transmissor electromagnetic signal of said rotational integrity abridgment transmissor; and
an abridgment transmissor electromagnetic signal transmitter capable of transmitting said abridgment transmissor electromagnetic signal from said rotational motive apparatus to facilitate a machine integrity determination based on said rotational integrity abridgment transmissor.

86. A high efficiency rotational machine integrity determination system according to clause 85, or any other clause, and further comprising an operational function energy apportioning decisional processor.

87. A high efficiency rotational machine integrity determination system according to clause 86, or any other clause, wherein said operational function energy apportioning decisional processor comprises a power supply evaluator and a power consumption determinater.

88. A high efficiency rotational machine integrity determination system according to clause 87, or any other clause, wherein said power consumption determinater is selected from a group consisting of a time-varying rotation indicia sensor power consumption determinater, a programmed rotational waveform data transformation processor power consumption determinater, and an abridgment transmissor electromagnetic signal transmitter power consumption determinater.

89. A high efficiency rotational machine integrity determination system according to clause 87, or any other clause, wherein said power consumption determinater is configured to determine power consumption for an activity selected from a group consisting of:
computational resources required to establish said rotational waveform data;
computational resources required to transform said rotational waveform data;
computational resources required to generate said rotational integrity abridgment transmissor;
computational resources required to create said abridgment transmissor electromagnetic signal;
computational resources required to transmit said abridgment transmissor electromagnetic signal;
computational resources required to compress;
computational resources required to uncompress;
frequency of transformation;
frequency of transmission;
frequency of sensing;
frequency of establishing rotational waveform data;
frequency of creation of an electromagnetic signal;
a compression algorithm;
a decompression algorithm;
transmission time;
degree of transformation;
degree of compression;
degree of error detection;
degree of error correction;
degree of error control;
amount of distortion introduced in said rotational abridgment transmissor; and
any combination thereof.

90. A high efficiency rotational machine integrity determination system according to clause 87 or 89, or any other clause, wherein said power consumption determinater is based on said power supply evaluator.

91. A high efficiency rotational machine integrity determination system according to clause 87 or 89, or any other clause, wherein said power supply evaluator comprises an evaluator of an element selected from a group consisting of a battery, a power plug, a sensor battery, device battery, a remote device battery, and any combination thereof.

92. A high efficiency rotational machine integrity determination system according to clause 86, or any other clause, wherein said operational function energy apportioning decisional processor comprises a reduced power consumption element.

93. A high efficiency rotational machine integrity determination system according to clause 85, or any other clause, and further comprising a data compression system.

94. A high efficiency rotational machine integrity determination system according to clause 93, or any other clause, wherein said data compression system comprises a data compression decisional processor.

95. A high efficiency rotational machine integrity determination system according to clause 93, or any other clause, wherein said data compressing system comprises a differential data compression system.

96. A high efficiency rotational machine integrity determination system according to clause 95, or any other clause, wherein said differential data compression system comprises at least two different compression systems.

97. A high efficiency rotational machine integrity determination system according to clause 96, or any other clause, wherein each of said at least two different compression systems are differentially responsive to at least two different time-varying rotational indicia sensors.

98. A high efficiency rotational machine integrity determination system according to clause 95, or any other clause, wherein said differential data compression system comprises a first partial data compression system and at least one additional partial data compressions system that is different from said first partial data compression system.

99. A high efficiency rotational machine integrity determination system according to clause 93 or 96, or any other clause, wherein said data compression system is selected from a group consisting of a complete data compression, a partial data compression, a parallel compression, a succession compression, a serial compression, a lossless data compression, a lossy data compression, compression lookup systems, and any combination thereof.

100. A high efficiency rotational machine integrity determination systems according to clause 93, or any other clause, wherein said rotational integrity abridgment transmissor comprises a compressed data transmissor.

101. A high efficiency rotational machine integrity determination system according to clause 100, or any other clause, wherein said abridgment transmissor electromagnetic signal transmitter comprises a compressed data electromagnetic signal transmitter.

102. A high efficiency rotational machine integrity determination system according to clause 101, or any other clause, wherein said compressed data electromagnetic signal transmitter comprises a reduced power consumption transmitter.

103. A high efficiency rotational machine integrity determination system according to clause 93, or any other clause, and further comprising a compression power consumption threshold.

104. A high efficiency rotational machine integrity determination system according to clause 103, or any other clause, wherein compression power consumption threshold comprises a dynamic compression power consumption threshold.

105. A high efficiency rotational machine integrity determination system according to clause 103, or any other clause, wherein said compression power consumption threshold is based on a power transmission requirement.

106. A high efficiency rotational machine integrity determination system according to clause 104, or any other clause, wherein dynamic compression power consumption threshold comprises a re-established compression power consumption threshold.

107. A high efficiency rotational machine integrity determination system according to clause 103, or any other clause, wherein said compression power consumption threshold comprises a machine specific compression power consumption threshold.

108. A high efficiency rotational machine integrity determination system according to clause 103, or any other clause, wherein said compression power consumption threshold is based on a table reference.

109. A high efficiency rotational machine integrity determination system according to clause 103, or any other clause, wherein said compression power consumption threshold is based on user input.

110. A high efficiency rotational machine integrity determination system according to clause 85, or any other clause, and further comprising an intelligent hierarchical data ranking element responsive to said rotational waveform data.

111. A high efficiency rotational machine integrity determination system according to clause 110, or any other clause, wherein said intelligent hierarchical data ranking element comprises an intelligent hierarchical data ranking decisional processor.

112. A high efficiency rotational machine integrity determination system according to clause 110, or any other clause, wherein said a programmed rotational waveform data transformation processor is responsive to said intelligent hierarchical data ranking element.

113. A high efficiency rotational machine integrity determination system according to clause 110, or any other clause, and further comprising a data compression system responsive to said intelligent data ranking element.

114. A high efficiency rotational machine integrity determination system according to clause 110, or any other clause, and further comprising a partial data compression system responsive to said intelligent data ranking element.

115. A high efficiency rotational machine integrity determination system according to clause 113, or any other clause, wherein said data compression system comprises a high ranked data compression system.

116. A high efficiency rotational machine integrity determination system according to clause 113, or any other clause, wherein said data compression system comprises a lossless compression system of at least part of high ranked data and a lossy compression system of at least part of low ranked data.

117. A high efficiency rotational machine integrity determination system according to clause 85, or any other clause, and further comprising differential data generated by a differential data processor.

118. A high efficiency rotational machine integrity determination system according to clause 117, or any other clause, wherein said differential data comprises subtracted data.

119. A high efficiency rotational machine integrity determination system according to clause 118, or any other clause, wherein said subtracted data comprises a difference between data based on said rotational waveform data and an element selected from a group consisting of historical data, standard data, curve fit data, reference data, and any combination thereof.

120. A high efficiency rotational machine integrity determination system according to clause 117 or 118, or any other clause, and further comprising a differential data compression system.

121. A high efficiency rotational machine integrity determination system according to clause 117, or any other clause, wherein said differential data comprises rotational motive apparatus operational information.

122. A high efficiency rotational machine integrity determination system according to clause 117, or any other clause, wherein said rotational integrity abridgment transmissor comprises said a differential data transmissor.

123. A high efficiency rotational machine integrity determination system according to clause 117, or any other clause, wherein said rotational integrity abridgment transmissor comprises compressed differential data.

124. A high efficiency rotational machine integrity determination system according to clause 122, or any other clause, wherein said abridgment transmissor electromagnetic signal transmitter capable of transmitting said abridgment transmissor electromagnetic signal from said rotational motive apparatus to facilitate a machine integrity determination based on said rotational integrity abridgment transmissor comprises an abridgment transmissor electromagnetic signal transmitter capable of transmitting said abridgment transmissor electromagnetic signal from said rotational motive apparatus to facilitate a machine integrity determination based on said differential data.

125. A high efficiency rotational machine integrity determination system according to clause 85, or any other clause, wherein said rotational integrity abridgment transmissor does not include raw data.
126. A high efficiency rotational machine integrity determination system according to clause 85, or any other clause, wherein said abridgment transmissor electromagnetic signal transmitter comprises a short distance abridgment transmissor electromagnetic signal transmitter.
127. A high efficiency rotational machine integrity determination system according to clause 85, or any other clause, wherein said abridgment transmissor electromagnetic signal transmitter comprises an on-demand abridgment transmissor electromagnetic signal transmitter.
128. A high efficiency rotational machine integrity determination system according to clause 85, or any other clause, wherein said abridgment transmissor electromagnetic signal comprises a reduced data abridgment transmissor electromagnetic signal transmitter.
129. A high efficiency rotational machine integrity determination system according to clause 126, or any other clause, wherein said short distance is selected from a group consisting of up to about 5 meters, up to about 10 meters, and up to about 15 meters.
130. A high efficiency rotational machine integrity determination system according to clause 85, or any other clause, wherein said rotational integrity abridgment transmissor comprises data selected from a group consisting of compressed data, subtracted data, a frequency spectrum, curve fit data, and any combination thereof.
131. A high efficiency rotational machine integrity determination system according to clause 118, or any other clause, wherein said subtracted data comprises data after subtracting a reference frequency spectrum from a new frequency spectrum.
132. A high efficiency rotational machine integrity determination system according to clause 85, or any other clause, and further comprising a rotational integrity abridgment transmissor processor.
133. A high efficiency rotational machine integrity determination system according to clause 132, or any other clause, wherein said rotational integrity abridgment transmissor processor comprises an off site rotational integrity abridgment transmissor processor.
134. A high efficiency rotational machine integrity determination system according to clause 85, or any other clause, wherein said time-varying rotation indicia comprises periodic time-varying rotation indicia.
135. A high efficiency rotational machine integrity determination system according to clause 85, or any other clause, and further comprising an abridgment transmissor electromagnetic signal receiver.
136. A high efficiency rotational machine integrity determination system according to clause 135, or any other clause, wherein said abridgment transmissor electromagnetic signal receiver comprises hand-held measuring device.
137. A high efficiency rotational machine integrity determination system according to clause 135, or any other clause, and further comprising a machine integrity evaluator.
138. A high efficiency rotational machine integrity determination system according to clause 137, or any other clause, wherein said machine integrity evaluator comprises an evaluation of said rotational integrity abridgment transmissor as compared to an element selected from a group consisting of reference data, historical data, table look-up data, and any combination thereof.
139. A high efficiency rotational machine integrity determination system according to clause 85, or any other clause, and further comprising a machine integrity determination generator.
140. A high efficiency rotational machine integrity determination system according to clause 139, or any other clause, wherein said a machine integrity determination generator comprises a non-visually based machine integrity determination generator.
141. A high efficiency rotational machine integrity determination system according to clause 85, or any other clause, wherein said programmed rotational waveform data transformation processor comprises an application specific integrated circuit (ASIC).
142. A high efficiency rotational machine integrity determination system according to clause 85, or any other clause, wherein said rotational motive apparatus comprises a rotating pump.
143. A high efficiency rotational machine integrity determination system according to clause 85, or any other clause, wherein said rotational motive apparatus comprises a rotating electric motor.
144. A high efficiency rotational machine integrity determination system according to clause 85, or any other clause, wherein said rotational motive apparatus comprises a compressor.
145. A high efficiency rotational machine integrity determination system according to clause 85, or any other clause, wherein said rotational motive apparatus comprises a rotating fan.
146. A high efficiency rotational machine integrity determination system according to clause 85, or any other clause, wherein said time-varying rotation indicia sensor comprises an on-machine sensor.
147. A high efficiency rotational machine integrity determination system according to clause 85, or any other clause, wherein said programmed rotational waveform data transformation processor comprises an on machine programmed rotational waveform data transformation processor.
148. A high efficiency rotational machine integrity determination system according to clause 85, or any other clause, wherein said abridgment transmissor electromagnetic signal transmitter comprises an on machine abridgment transmissor electromagnetic signal transmitter.
149. A high efficiency rotational machine integrity determination system according to clause 85, or any other clause, wherein said abridgment transmissor electromagnetic signal transmitter capable of transmitting said abridgment transmissor electromagnetic signal from said rotational motive apparatus to facility a machine integrity determination based on said rotational integrity abridgment transmissor comprises an abridgment transmissor electromagnetic signal transmitter capable of transmitting said abridgment transmissor electromagnetic signal from said time-varying rotational indicia sensor on said rotational motive apparatus to facility a machine integrity determination based on said rotational integrity abridgment transmissor
150. A high efficiency rotational machine integrity determination system according to clause 85, or any other clause, wherein said rotational motive apparatus is part of an interdependent process.
151. A high efficiency rotational machine integrity determination system according to clause 85 or 150, or any other clause, wherein said rotational motive apparatus comprises a plurality of rotational motive apparatuses.
152. A high efficiency rotational machine integrity determination system according to clause 85, or any other clause, wherein said time-varying rotation indicia sensor comprises a vibration sensor.
153. A high efficiency rotational machine integrity determination system according to clause 85, or any other clause, and further comprising at least one additional indicia sensor.
154. A high efficiency rotational machine integrity determination system according to clause 93, or any other clause, and further comprising a decompression system.
155. A high efficiency rotational machine integrity determination system according to clause 153, or any other clause, wherein said at least one additional indicia sensor is configured to sense an indicia selected from a group consisting of temperature, pressure, dynamic load, and speed.

As can be easily understood from the foregoing, the basic concepts of the present invention may be embodied in a variety of ways. It involves both energy efficient techniques as well as devices to accomplish the appropriate energy efficiency. In this application, the energy efficient techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "transformation" should be understood to encompass disclosure of the act of "transforming"—whether explicitly discussed or not—and, conversely, were there effectively disclosure of the act of "transforming", such a disclosure should be understood to encompass disclosure of a "transformation" and even a "means for "transforming." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, algorithms, systems, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

U.S. PATENTS

| Pat. No. | Kind Code | Issue Date | Name of Patentee or Applicant of cited Document |
|---|---|---|---|
| 4,422,333 | A | 1983 Dec. 27 | Leon |
| 4,931,949 | A | 1990 Jun. 05 | Hernandez et al. |
| 5,233,540 | A | 1993 Aug. 03 | Andersson et al. |
| 5,311,446 | A | 1994 May 10 | Ross et al. |
| 5,471,880 | A | 1995 Dec. 05 | Lang et al. |
| 5,943,634 | a | 1999 Aug. 24 | Piety et al. |
| 6,270,628 | B1 | 2001 Aug. 07 | Suomi et al. |
| 6,298,725 | B1 | 2001 Oct. 09 | Forrester |
| 6,421,615 | B1 | 2002 Jul. 16 | Nakajima et al. |
| 6,484,109 | B1 | 2002 Nov. 19 | Lofall |
| 6,507,165 | B2 | 2003 Jan. 14 | Kato et al. |
| 6,549,869 | B1 | 2003 Apr. 15 | Piety et al. |
| 6,633,822 | B2 | 2003 Oct. 14 | Maness et al. |
| 7,099,782 | B2 | 2006 Aug. 29 | Hitchcock et al. |
| 6,526,829 | B1 | 2003 Mar. 04 | Lysen et al. |
| 6,789,025 | B2 | 2004 Sep. 07 | Boerhout |
| 7,289,919 | B2 | 2007 Oct. 30 | Boerhout |
| 7,930,111 | B2 | 2011 Apr. 19 | Lou et al. |
| 7,822,580 | B2 | 2010 Oct. 26 | Mustonen |
| 6,192,325 | B1 | 2011 Feb. 20 | Piety et al. |
| 4,612,620 | A | 1986 Sep. 16 | Davis et al. |
| 7,206,646 | B2 | 2007 Apr. 17 | Nixon et al. |
| 7,634,384 | B2 | 2009 Dec. 15 | Eryurek et al. |
| 6,704,617 | B2 | 2004 Mar. 09 | Cherfane et al. |
| 7,676,285 | B2 | 2010 Mar. 09 | Hoyte et al. |
| 7,263,459 | B2 | 2007 Aug. 28 | Ito et al. |
| 7,127,373 | B2 | 2006 Oct. 24 | House et al. |
| 6,374,195 | B1 | 2002 Apr. 16 | Li et al. |
| 7,313,502 | B2 | 2007 Dec. 25 | Schuster et al. |
| 5,115,406 | | 1992 May 19 | Zatezalo et al. |
| 7,660,701 | B2 | 2010 Feb. 09 | Sharpe Jr. |
| 7,324,924 | B2 | 2008 Jan. 29 | Barajas et al. |
| 7,096,159 | B2 | 2006 Aug. 22 | Cataltepe et al. |

FOREIGN PATENT DOCUMENTS

| Foreign Document Number | Country Code | Kind Code | Publication Date | Name of Patentee or Applicant of cited Document |
|---|---|---|---|---|
| 03006935 | WO | | 2003 Jan. 23 | Shell Internationale Research Maatschappij B.V. |
| 07219624 | WO | A | 1999 Aug. 18 | Hitachi Ltd. N/A |
| 07261834 | WO | A | 1995 Oct. 13 | oshiba Corp. N/A |

NON-PATENT LITERATURE DOCUMENTS

Lembregts et al., Off-line Synchronous resampling of vibration measurement; Instrumentation and Measurement Technology Conference, 1996. IMTC-96. Conference Proceedings., IEEE LMS International NV, pp. 748-755

Thus, the applicant(s) should be understood to have support to claim and make a statement of invention to at least: i) each of the energy efficient devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, the applicant(s) should be understood to have support to claim and make a statement of invention to at least: xv) processes performed with the aid of or on a computer as described throughout the above discussion, xvi) a programmable apparatus as described throughout the above discussion, xvii) a computer readable memory encoded with data to direct a computer comprising means or elements which function as described throughout the above discussion, xviii) a computer configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) the related methods disclosed and described, xxvi) similar, equivalent, and even implicit variations of each of these systems and methods, xxvii) those alternative designs which accomplish each of the functions shown as are disclosed and described, xxviii) those alternative designs and methods which accomplish each of the functions shown as are implicit to accomplish that which is disclosed and described, xxix) each feature, component, and step shown as separate and independent inventions, and xxx) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A high efficiency rotational machine integrity determination system comprising:
   a time-varying rotational indicia sensor being an on-machine sensor configured to generate rotational waveform data responsive to a rotational motive apparatus-rotational waveform data;
   an operational function energy apportioning decisional processor comprising an intelligent data ranking element, a power consumption determiner, and a data compression system, the operational function energy apportioning decisional processor comprising a data compression decisional processor facilitating a machine integrity determination of said rotational motive apparatus with respect to compressed data, the power consumption determiner determining a power requirement for actions of the high efficiency rotational machine integrity determination system; and
   a signal transmitter capable of transmitting a signal from said rotational motive apparatus to facilitate the machine integrity determination, the signal transmitter comprising a reduced power consumption transmitter providing a reduced power requirement, the reduced power requirement being dynamically established based on a dynamic compression power consumption threshold;
   wherein the data compression system is responsive to said intelligent data ranking element, said data compression system comprising a lossless compression system of at least part of high ranked data and a lossy compression system of at least part of low ranked data.

2. A high efficiency rotational machine integrity determination system according to claim 1 wherein said signal comprises an abridgment transmissor electromagnetic signal.

3. A high efficiency rotational machine integrity determination system according to claim 1 and further comprising a power supply evaluator.

4. A high efficiency rotational machine integrity determination system according to claim 3 wherein said power consumption determiner is selected from a group consisting of a time-varying rotation indicia sensor power consumption determiner, a programmed rotational waveform data transformation processor power consumption determiner, and an abridgment transmissor electromagnetic signal transmitter power consumption determiner.

5. A high efficiency rotational machine integrity determination system according to claim 3 wherein said power consumption determiner is configured to determine power consumption for:
   computational resources required to establish said rotational waveform data;
   computational resources required to transform said rotational waveform data;
   computational resources required to generate said rotational integrity abridgment transmissor;
   computational resources required to create said abridgment transmissor electromagnetic signal;
   computational resources required to transmit said abridgment transmissor electromagnetic signal;
   computational resources required to compress;

computational resources required to uncompress;
a compression algorithm;
a decompression algorithm;
amount of distortion introduced in said rotational abridgment transmissor; and
any combination thereof.

6. A high efficiency rotational machine integrity determination system according to claim 3 wherein said power consumption determinater is based on said power supply evaluator.

7. A high efficiency rotational machine integrity determination system according to claim 3 wherein said power supply evaluator comprises an evaluator of an element selected from a group consisting of a battery, a power plug, a sensor battery, device battery, a remote device battery, and any combination thereof.

8. A high efficiency rotational machine integrity determination system according to claim 1 and further comprising an intelligent hierarchical data ranking element responsive to said rotational waveform data.

9. A high efficiency rotational machine integrity determination system according to claim 8 wherein said intelligent hierarchical data ranking element comprises an intelligent hierarchical data ranking decisional processor.

10. A high efficiency rotational machine integrity determination system according to claim 8 and further comprising a partial data compression system responsive to said intelligent data ranking element.

11. A high efficiency rotational machine integrity determination system according to claim 8 wherein said data compression system comprises a high ranked data compression system.

12. A high efficiency rotational machine integrity determination system according to claim 1 the dynamic compression power consumption threshold is a power requirement threshold based on a power transmission requirement and a machine specific power requirement threshold.

13. A high efficiency rotational machine integrity determination system according to claim 1 wherein the dynamic compression power consumption threshold is a power requirement threshold based on a table reference or user input.

* * * * *